March 17, 1970     C. F. LOGAN     3,500,841
FLUID RECOVERY SYSTEM AND METHOD
Filed Aug. 1, 1968

INVENTOR.
CAMPBELL F. LOGAN
BY
George H. Baldwin
ATTORNEY

United States Patent Office 3,500,841
Patented Mar. 17, 1970

3,500,841
FLUID RECOVERY SYSTEM AND METHOD
Campbell F. Logan, 530 Goodwin St.,
Jacksonville, Fla. 32204
Filed Aug. 1, 1968, Ser. No. 749,415
Int. Cl. F17d *1/16, 1/18*
U.S. Cl. 137—13                                10 Claims

ABSTRACT OF THE DISCLOSURE

A method and system for recovering a fluid leaking from a crack in a submerged flowline or the like, in a flowing body of water wherein the fluid has a specific gravity less than the specific gravity of water and substantially immiscible therewith, the system includes a chamber positioned adjacently above the crack, and means are attached to the chamber to fix the relative position between the chamber and the crack. The chamber has an open bottom to permit ingress of the fluid leaking from the crack to flow into the chamber. An elongated conduit is attached to the chamber and extends upwardly to a position adjacent the water's surface, the conduit providing a protected path for the leaking fluid from the chamber to the water's surface. A disposal means, including a burner, is attached to the conduit adjacent the water's surface for disposing of the fluid which has been passed through the conduit. When the fluid being recovered is a liquid, the system may include a gas elevating means, having a gas source in the boat and another conduit between the gas source and chamber, to assist the liquid in moving from the chamber through the first mentioned conduit.

BACKGROUND OF THE INVENTION

Field of the invention

This invention relates to a fluid recovery method and system for confining and disposing of leaking fluid from a submerged flowline or the like.

Description of the prior art

Fluid recovery systems of various types have been devised for use in recovering escaping fluid from a flowline and/or a leaking boat or barge, such a system is exemplified by my prior Patent No. 3,389,559, entitled Fluid Recovery System and Method, issued on June 25, 1968. Problems are encountered in the prior art systems when the fluid attempted to be recovered is escaping from a leak in a submerged flowline or the like in a body of water having a swift, irregular or variable current.

SUMMARY

This invention relates to a method of recovering fluid leaking from a crack or other opening in a flowline or the like beneath a body of water having a current flow with the fluid having a specific gravity lower than that of water and substantially immiscible with the water. The steps of the method include locating the crack in the flowline or the like, locating a fluid confining chamber immediately above the crack, passing the confined fluid upward through a conduit to the surface of the water and disposing of the fluid by, for example, burning same. When the leaking fluid is a liquid, the method also includes the step of passing gas into the fluid confining chamber for assisting the elevation of the liquid through the conduit.

This invention further relates to a system for recovering the leaking fluid including a chamber, and means attached to the chamber to fix the chamber above the crack. The chamber has an open bottom to permit the fluid leaking from the crack to enter the chamber. An elongated conduit is attached to the chamber and extends to the water's surface. The leaking fluid passes from the crack into the chamber and upwardly through the conduit, and means are attached to the conduit adjacent the water's surface for disposing of the fluid as by burning thereof. When the fluid is a liquid, the system includes gas means communicating with the chamber for furnishing gas thereto thus providing an elevating medium for assisting the liquid in moving from the chamber through the conduit.

A general object of this invention is to provide an improved method and system for recovering fluids which are leaking from submerged flowlines or the like.

A particular object of the present invention is the provision of an improved method and system for preventing pollution of or hazards caused in a body of water by escaping fluids from flowlines, specifically when the body of water has a swift or irregular current therein.

Specific objects of this invention are to provide a method and system for recovering leaking fluids from a submerged flowline or the like which are simple and inexpensive in the manufacture, installation, operation and maintenance thereof, and efficient in the use of the invention.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

DESCRIPTION OF THE PREFERRED EMBODIMENTS

Figures 1, 2:
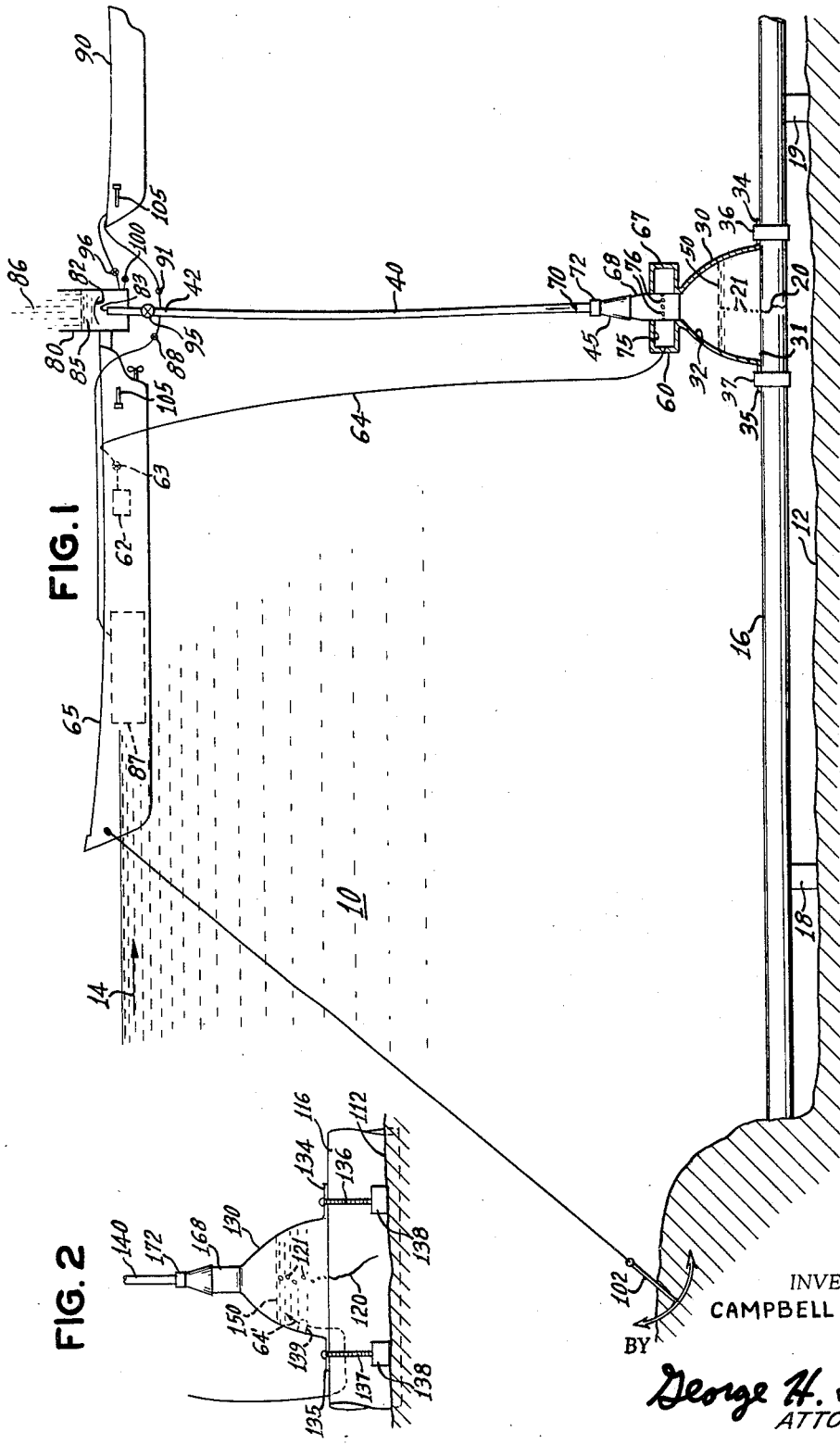
FIG. 1 is a side elevational view of the fluid recovery system in accord with the invention.
FIG. 2 is a side elevational view of a modified portion of the fluid recovery system depicted in FIG. 1.

Referring now more particularly to FIG. 1, a body of water 10 includes a basin or bottom 12 with the water flowing in the direction of arrow 14, the body of water being a harbor or a river or the like in which the water current is swift as compared to, for example, a lake. While the recovery system and method are of particular importance in a body of water having a swift current, it is to be understood, that the recovery system and method are not intended to be limited to use in such a body of water.

A submerged flowline 16 is supported on the bottom 12 by struts, including struts 18 and 19 or in another manner known in the art. A hole or crack 20 in pipeline 16 has occurred in the pipeline and fluid 21 is escaping therefrom. The fluid 21 may be any liquid or gas which is transportable by use of a flowline and has a specific gravity lower than the specific gravity of the water surrounding the flowline and is generally immiscible with the water. Oil and gasoline are common liquids which may be flowing through flowline 16 while natural gas might in other circumstances be flowing through such a flowline.

When a crack or other leak occurs in the flowline or the like and it becomes noticed at the surface of the water or by decreased pressure in the flowline, a crew is immediately dispatched to install the system of this invention. After finding the fault, the diver connects a chamber 30 directly above and adjacent the crack 20, the chamber 30 herein being shown as a generally inverted funnel member having an open bottom 31 into which the fluid 50 enters within the hollow 32 of chamber 30. Flanges 34 and 35 are integrally connected to the main chamber 30 and releasable straps 36 and 37 respectively attached flanges 34 and 35 to pipe 16, straps 36 and 37 encircling the pipe as shown. An elongated conduit 40 has its lower end 41 connected to chamber 30 with its upper end portion 42 adjacent the surface of the water, conduit 40 communicates with hollow 32 of chamber 30 to permit the fluid 50 which has escaped from crack 20, as shown by bubbles 21 of fluid 50, to collect within the hollow 32 and to flow upwardly through conduit 40 to a position adjacent the surface of the water.

When the fluid 50 being recovered from crack 20 is a liquid, it is desirable to provide a gas elevating means indicated generally at 60. Gas elevating means 60 comprises a source of gas 62 positioned within main boat 65 floating at the water's surface, a control valve 63 and another conduit means 64 communicating between gas source 62 and chamber 30. The upper end portion 67 of chamber 30 includes a toroidal housing 67 surrounding an elongated nipple 68 which communicates with the hollow 32 of chamber 30. Nipple 68 is hollow and provides a passageway between hollow 32 and the conduit 40 with the conduit 40 being connected to the upper end portion 70 of the nipple by a hose clamp 72 or the like in a well known manner. The toroidal housing 67 includes a hollow 75 which confines the gas supplied thereto by conduit 64 and a plurality of spaced passageways 76 extend laterally through nipple 68 for communicating between hollow 75 and the passageway (not shown) through the nipple 68 which communicates between hollow 32 of chamber 30 and conduit 40. It is thus seen that the gas being supplied through conduit 64 enters into hollow 75 and through passageway 76 to assist the movement of the liquid 50 which had been confined within the hollow 32 of chamber 30 thereby insuring removal of the confined liquid 50 from hollow 32 so that the liquid 50 will not spill out from beneath chamber 30 through open bottom 31 to further pollute the body of water.

With the fluid being raised to the surface of the water, disposal of such captured fluid presents a problem which may be solved in various ways. A burner 80 is shown mounted aft of the main boat 65 with the burner 80 normally including a baffle 82 above the outlet 83 of the conduit 40 to prevent discharge of such fluid outwardly of the burner. The captured fluid 85 may be burned as indicated by flames 86, may be stored in the container 87 on main boat 65 by opening valve 88 or may be stored in a separate barge 90 by opening of valve 91. Valves 88 and 91 are in line with conduit 40 prior to the conduit entering burner 80; it being understood that valve 95 would normally be closed when it was desired to divert the fluid through valve 88 or 91 respectively into container 87 or barge 90. If the fluid were being burned and an excess of fluid were entering the burner 80, valve 95 could be partially closed with the excess fluid being diverted through 88 or 91, or through another valve 96 which is in a line between burner 80 and barge 90. It is also preferred to install a water relief valve 100 on burner 80 so that water entering burner 80 may be bled off when desired.

Since the water 10 is flowing in the direction of arrow 14 it is important to fix the position of the main boat 65 by line 103 attached to anchor 102, anchor 102 being imbedded within the basin 12. Barge 90 is connected to main boat 65 by tow line 105, shown broken in FIG. 1 for clarity.

When a crack 120 develops in a pipeline or flowline 116 which is partly imbedded beneath basin 112, as shown in FIG. 2, an alternate manner of attaching the chamber 130 in fixed position above crack 120 may be employed. Rather than the bands 36 and 37 surrounding the pipe, as shown in FIG. 1, a plurality of straps or chains 136 and 137 are connected to flanges 134 and 135 on either side of the flowline 116 and a plurality of weights 138 are connected to chains 136 and 137 and rest on the basin 112 thereby fixing chamber 130 with respect to crack 120 and pipeline 116.

FIG. 2 also depicts an alternate manner of providing the gas elevating means by passing conduit 64 beneath chamber 130 and clamping the exit end portion 64' to a clamp 139 attached within chamber 130, as shown by broken lines. Nipple 168 is thus seen to not be provided with openings similar to passageways 76 in nipple 68 of FIG. 1.

It is to be understood that other means, such as magnetic attaching means or the like, may be provided to connect chamber 130 to pipeline 116 or to fix the relative positions between 130 and crack 120 therebeneath without departing from the spirit and scope of this invention.

While only certain preferred embodiments of this invention have been shown and described by way of illustration, many modifications will occur to those skilled in the art and it is intended that all such modifications be included within the true spirit and scope of this invention.

What is claimed as new and what it is desired to secure by Letters Patent of the United States is:

1. A method of recovering a fluid escaping from a crack in a flowline or the like submerged in a body of flowing water, the fluid having specific gravity lower than that of water and substantially immiscible therewith comprising the steps of locating the crack, locating a fluid confining chamber above and adjacent the crack, passing the confined fluid upwardly through a conduit to the surface of the water, and thereafter disposing of the fluid.

2. In the method as defined in claim 1 wherein said step of disposing of the fluid includes the step of burning the fluid.

3. In the method as defined in claim 1 wherein the fluid is liquid, further comprising the step of passing gas through another conduit to the fluid confining chamber, said step of passing the confined liquid upwardly through conduit being assisted by the gas supplied to the chamber whereby the liquid and gas are moved upwardly through the conduit to the surface of the water, said step of disposing including disposing of the liquid and the gas.

4. In the method as defined in claim 3 wherein the step of disposing of the liquid and the gas includes the step of burning of the liquid.

5. A system for recovering a fluid leaking from a crack in a flowline or the like submerged in a flowing body of water wherein the fluid has a specific gravity less than the specific gravity of water and substantially immiscible therewith comprising a chamber positioned adjacent to and above the crack, means attached to said chamber to fix the position of said chamber above the crack, said chamber having a bottom with an opening therein to permit ingress of the fluid leaking from the crack into said chamber, an elongated conduit having a lower end attached to said chamber and extending upwardly to a position adjacent the surface of the water, the leaking fluid passing from the crack into said chamber and upwardly through said conduit, and means attached to the upper end of said conduit for disposing of the fluid which has been passed through said conduit.

6. In the system as defined in claim 5 wherein said means attached to said chamber includes a pair of releasable strap means, said strap means being adapted and arranged for connection of said chamber to the submerged flowline immediately above the crack through which the fluid is leaking.

7. In the system as defined in claim 5 wherein said means attached to said chamber includes a plurality of spaced weight means, said weight means including weights resting on the basin of the body of water with said chamber being fixedly positioned above the crack through which the fluid is leaking.

8. In the system as defined in claim 5 wherein the means attached to the upper end of said conduit includes a burner for burning of the fluid passed thereinto from said conduit.

9. In the system as defined in claim 5 wherein the fluid leaking from the crack is a liquid, further comprising another elongated conduit extending from adjacent said surface at its upper end to its lower end which communicates with said chamber, gas means attached to said upper end of said other conduit for furnishing gas through said other conduit to said chamber, the gas supplied to said chamber providing an elevating medium for assisting the liquid in moving from said chamber upwardly through said conduit.

10. In the system as defined in claim 9 wherein said chamber includes a first portion for confining the liquid leaking from the crack and a second portion for confining the gas supplied thereto by said other conduit, said second portion communicating with said first portion through a plurality of spaced passageways to provide gas to said first portion thereby assisting the movement of the liquid therefrom and through said conduit.

References Cited

UNITED STATES PATENTS

| | | | |
|---|---|---|---|
| 2,783,970 | 3/1957 | Gillespie | 137—344 |
| 2,812,641 | 11/1957 | Elliott | 61—69 X |
| 3,265,130 | 8/1966 | Watkins | 61—69 X |
| 3,386,254 | 6/1968 | Connally | 61—69 |

ALAN COHAN, Primary Examiner

D. R. MATTHEWS, Assistant Examiner

U.S. Cl. X.R.

61—69, 72.3; 137—315